(12) United States Patent
Hsin

(10) Patent No.: US 8,707,570 B2
(45) Date of Patent: Apr. 29, 2014

(54) ALIGNMENT APPARATUS

(75) Inventor: Ming-Tsung Hsin, Taipei (TW)

(73) Assignee: Altek Corporation, Hsinchu (TW)

( * ) Notice: Subject to any disclaimer, the term of this patent is extended or adjusted under 35 U.S.C. 154(b) by 265 days.

(21) Appl. No.: 13/213,090

(22) Filed: Aug. 19, 2011

(65) Prior Publication Data

US 2012/0307077 A1 Dec. 6, 2012

(30) Foreign Application Priority Data

May 31, 2011 (TW) .............................. 100119032 A

(51) Int. Cl.
*G01D 21/00* (2006.01)

(52) U.S. Cl.
USPC ................................. 33/1 M; 33/613; 33/645

(58) Field of Classification Search
USPC ........ 33/1 M, 1 BB, 710, 712, 533, 613, 641, 33/644, 645, 577
See application file for complete search history.

(56) References Cited

U.S. PATENT DOCUMENTS

| 5,453,840 | A | * | 9/1995 | Parker et al. ................... 356/400 |
| 6,473,205 | B1 | * | 10/2002 | Pepe .............................. 358/483 |
| 7,090,177 | B2 | * | 8/2006 | Milton et al. .............. 248/180.1 |
| 2007/0159532 | A1 | * | 7/2007 | Kiyokawa ..................... 348/187 |
| 2012/0307077 | A1 | * | 12/2012 | Hsin ............................. 348/187 |

* cited by examiner

*Primary Examiner* — Yaritza Guadalupe-McCall
(74) *Attorney, Agent, or Firm* — Jianq Chyun IP Office

(57) ABSTRACT

An alignment apparatus for adjusting an image sensor is provided. The alignment apparatus includes a first stage, a second stage, a positioning aligned unit, and an adjustment unit. The second stage is floatingly disposed on the first stage. The image sensor is adapted to be disposed on the second stage. The positioning aligned unit connected between the first stage and the second stage constrains the second stage on a datum surface above the first stage. The positioning aligned unit coupled to the second stage drives the second stage to rotate along the datum surface.

12 Claims, 7 Drawing Sheets

US 8,707,570 B2

ALIGNMENT APPARATUS

CROSS-REFERENCE TO RELATED APPLICATION

This application claims the priority benefit of Taiwan application serial no. 100119032, filed on May 31, 2011. The entirety of the above-mentioned patent application is hereby incorporated by reference herein and made a part of this specification.

BACKGROUND OF THE INVENTION

1. Field of the Invention

The present invention relates to an alignment apparatus, and more particular, to an alignment apparatus for an image sensor.

2. Description of Related Art

Existing alignment apparatuses for image sensors usually adopt a coaxial movement stage, such as, an inclined stage that is driven by a gear to rotate in a specific direction to adjust an angle of inclination of an object. However, this type of stage fails to constrain a height coordinate of the object. In other words, when adjusting the inclination angle of the stage on which the object is disposed, it will cause a change in the height coordinate of the stage on which the object is disposed at the same time. Therefore, when a user performs the alignment process, he or she must also adjust the height of the stage on which the object is disposed. As a result, to the user, this increases the complexity and difficulty in operation, which is adverse for the alignment process of the image sensor.

SUMMARY OF THE INVENTION

Accordingly, the present invention is directed to an alignment apparatus which has a good alignment capability and stability.

One embodiment of the present invention provides an alignment apparatus comprising a first stage, a second stage, a positioning aligned unit and a first adjustment unit. The second stage is floatingly disposed on the first stage. The image sensor is adapted to be disposed on the second stage. The positioning aligned unit is connected between the first stage and the second stage and constrains the second stage on a datum surface above the first stage. The first adjustment unit is coupled to the second stage to drive the second stage to rotate along the datum surface.

In one embodiment, the positioning aligned unit comprises a plurality of positioning elements disposed on the first stage, and a plurality of elastic elements connected between the first stage and the second stage. The elastic elements drive the second stage to rest against the positioning elements.

In one embodiment, the second stage comprises a plurality of first coupling portions. Each ball bearing comprises a base portion and a second coupling portion. The base portion is embedded into the first stage, and the second coupling portion is disposed on the base portion. The second coupling portions form the datum surface and are coupled to the first coupling portions, respectively.

In one embodiment, a surface contour of each of the first coupling portions conforms to a surface contour of a corresponding one of the second coupling portion.

In one embodiment, the surface contour of each of the first coupling portions and the surface contour of each of the second coupling portions are each a sphere.

In one embodiment, when the second stage is parallel to the first stage, the datum surface is a planar surface.

In one embodiment, when the second stage is not parallel to the first stage, the datum surface is a sphere.

In one embodiment, the first adjustment unit comprises a frame and a plurality of adjustment elements. The adjustment elements are pivotably connected to the frame and movably abut against a bottom side of the second stage.

In one embodiment, each adjustment element comprises a pivot portion, an adjustment portion and an abutting portion. The orthographic projection of the pivot portion onto a normal line of the first stage is located between the orthographic projection of the abutting portion onto the normal line and the orthographic projection of the adjustment portion onto the normal line.

In one embodiment, the alignment apparatus further comprises a base and a second adjustment unit. The first stage, the first adjustment unit and the frame are respectively disposed on the base. The second adjustment unit is connected between the base and the first stage. The second adjustment unit drives the first stage to translate relative to the base.

In one embodiment, the second adjustment unit is located at one side of the frame, and the adjustment elements are located at another two sides of the frame adjacent the second adjustment unit.

In one embodiment, the alignment apparatus further comprises an optical correction module disposed on the base and under the first stage.

In view of the foregoing, in the alignment apparatus of the above embodiments of the present invention, the first stage and the second stage are floatingly coupled to each other, and the positioning aligned unit is disposed between the two stages, such that the second stage can be driven by the adjustment unit to rotate relative to the first stage and can be constrained on the datum surface by the positioning aligned unit. This avoids the relative displacement between the second stage and the first stage due to rotation of the second stage, thus increasing the stability of the second stage during movement.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
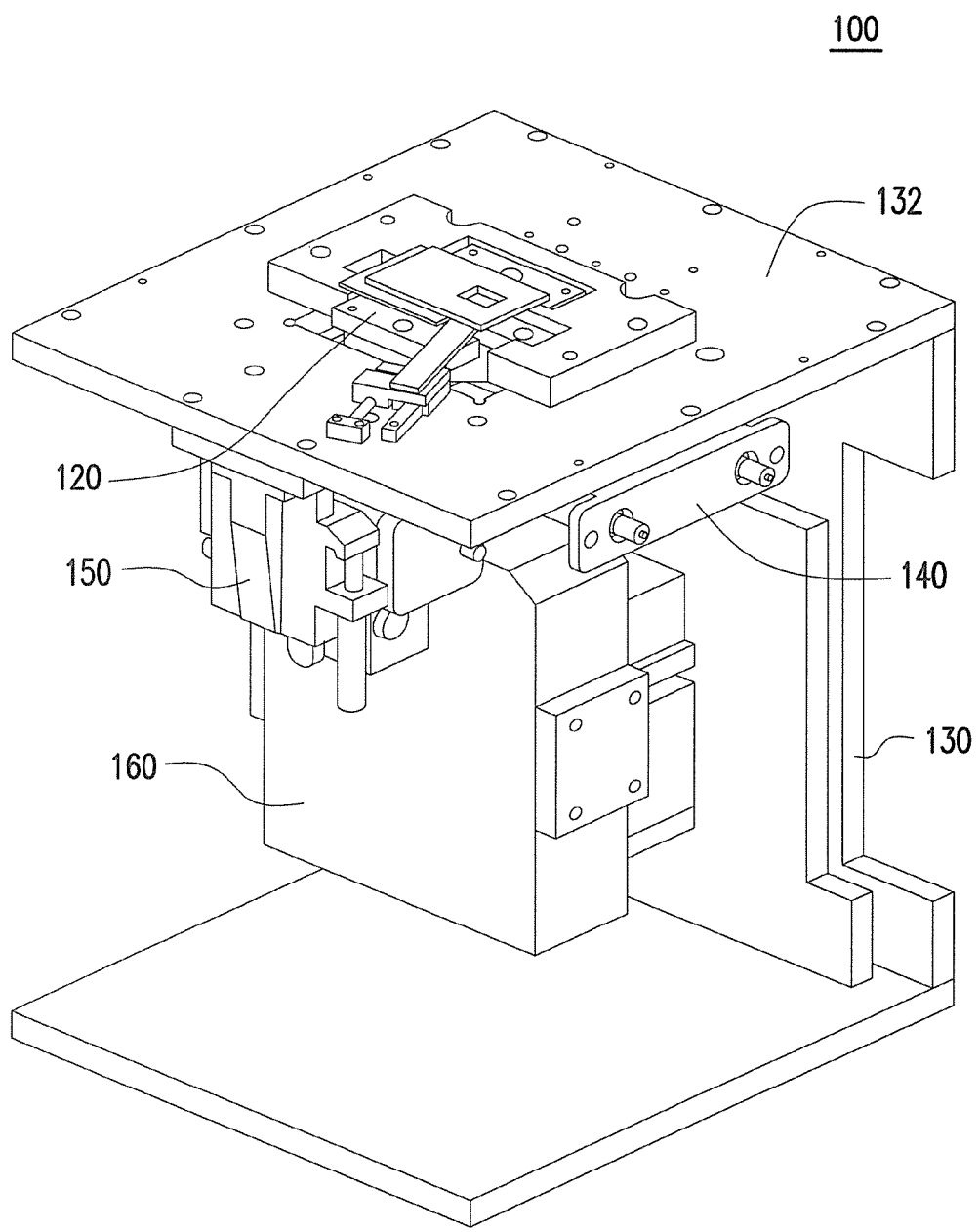
FIG. 1 illustrates an alignment apparatus according to one embodiment of the present invention.
Figure 2:
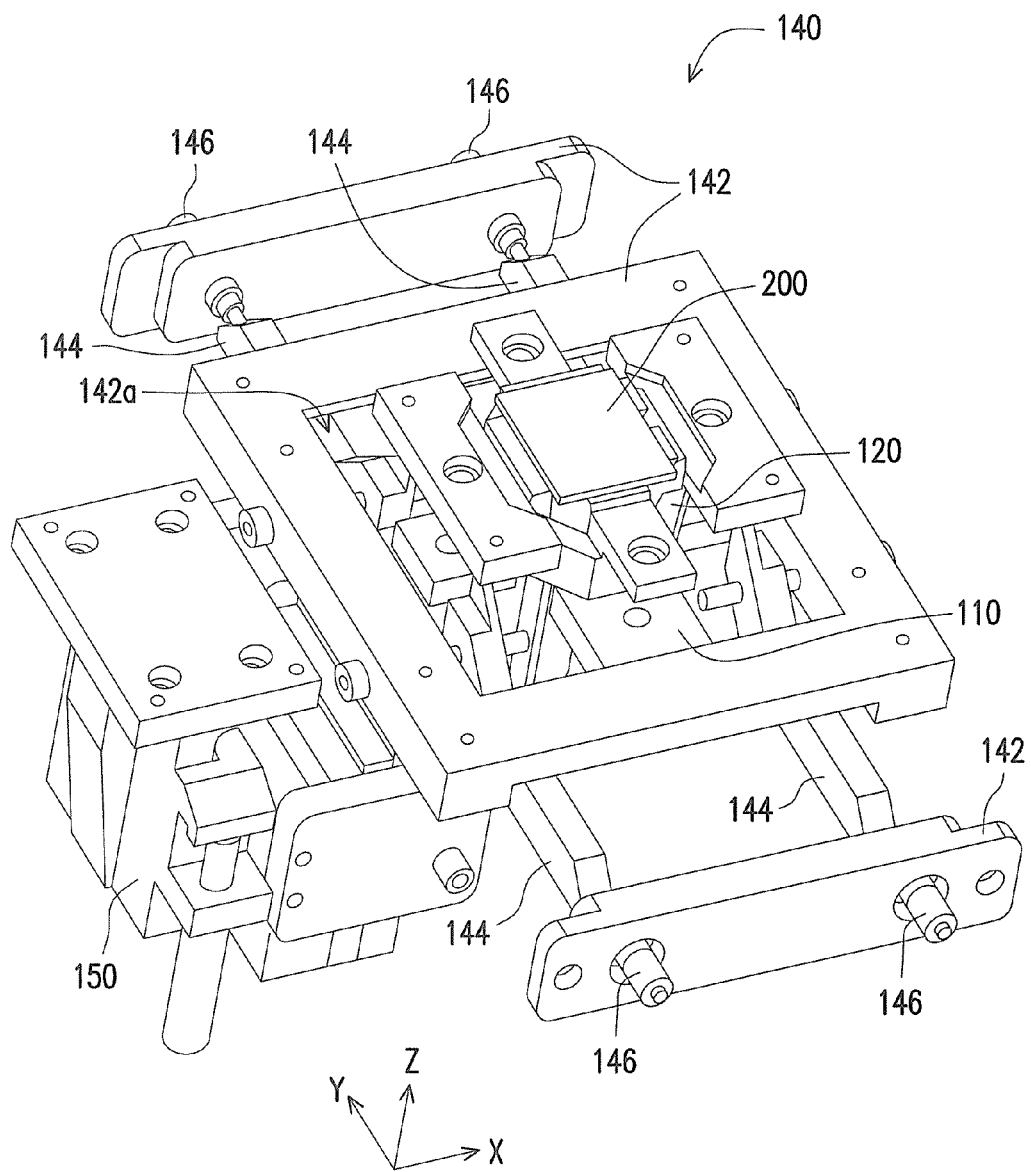
FIG. 2 and FIG. 3 are partial views of the alignment apparatus of FIG. 1.
Figure 3:
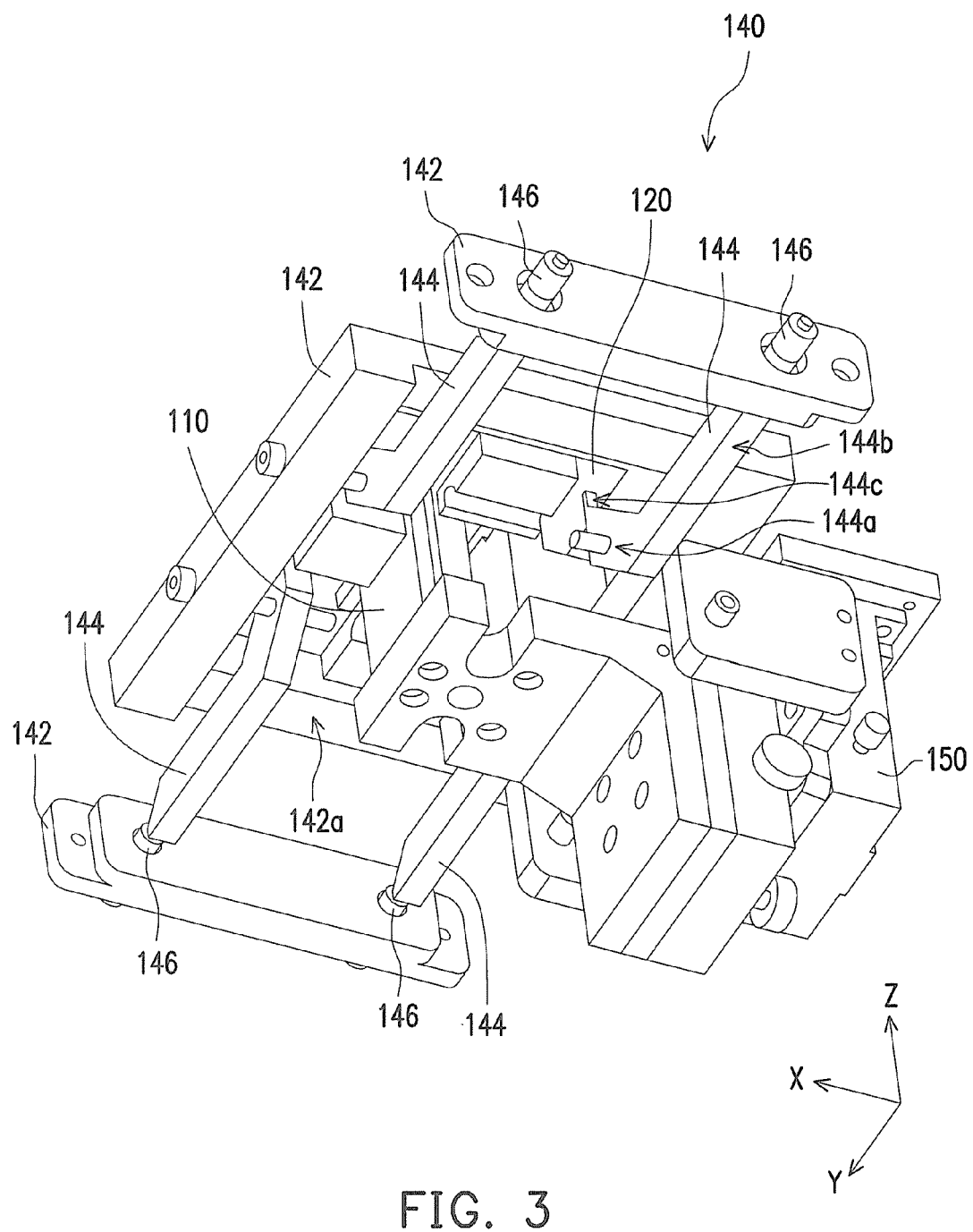
Figure 4:
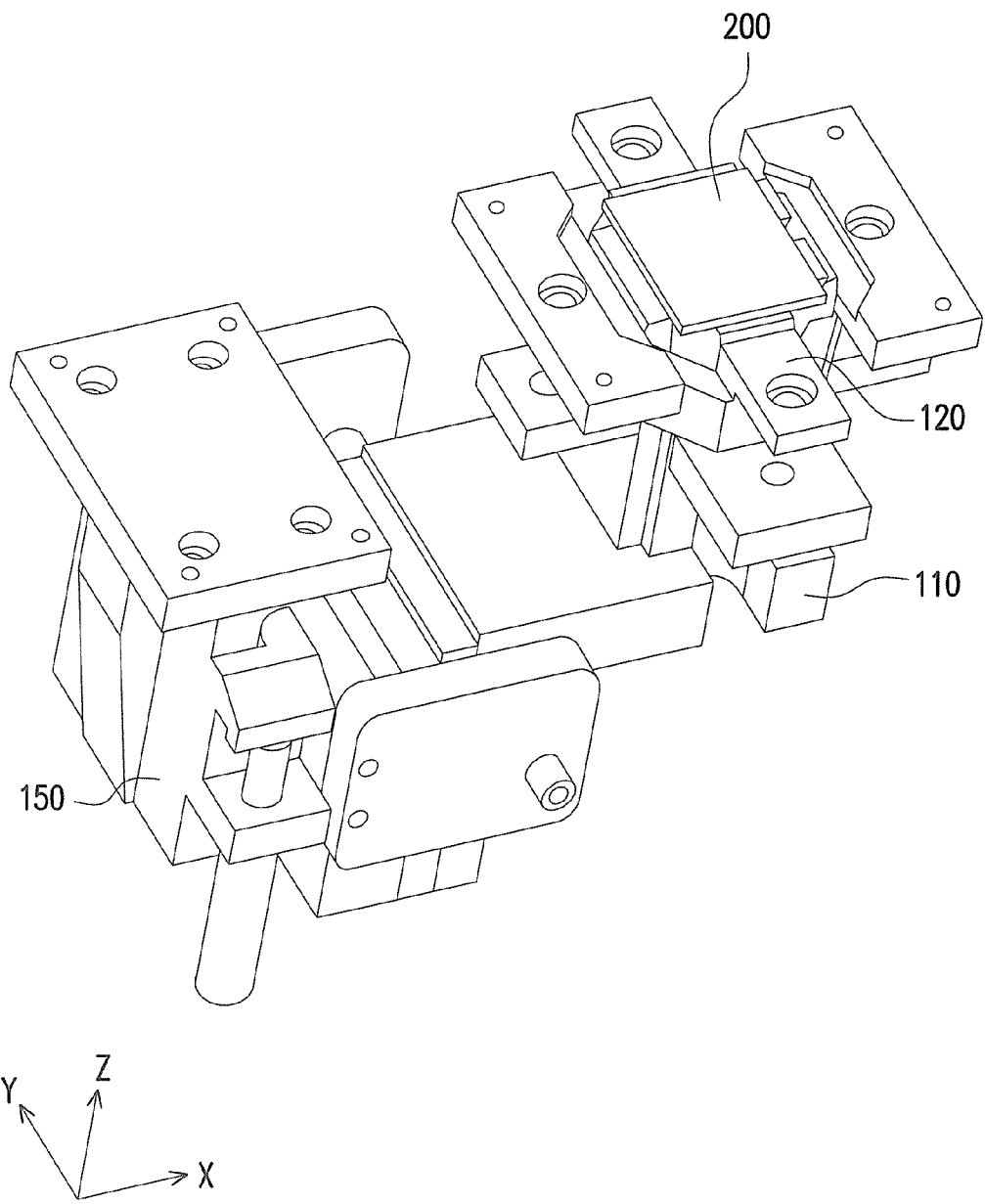
FIG. 4 is a partial view of the alignment apparatus of FIG. 2.

FIG. 1 illustrates an alignment apparatus according to one embodiment of the present invention. FIG. 2 and FIG. 3 are partial views of the alignment apparatus of FIG. 1, viewed from different angles to clearly see the relationship among various components thereof. FIG. 4 is a partial view of the alignment apparatus of FIG. 2. Referring to FIG. 1 to FIG. 4, in the present embodiment, the alignment apparatus 100 is used to adjust an image sensor 200 to align the image sensor 200 with an optical system (for example, a lens module that is not shown) to thereby complete an assembly process. The alignment apparatus 100 includes a first stage 110, a second stage 120, a base 130, a first adjustment unit 140, a second adjustment unit 150, and an optical correction module 160.

The second stage 120 is floatingly disposed on the first stage 110. The image sensor 200 is, for example, a charge coupled device (CCD) adapted to be positioned on the second stage 120 by a vacuum apparatus (not shown). The second adjustment unit 150 is connected between the first stage 110 and the base 130. The first adjustment unit 140 is disposed on the base 130 and coupled to the second stage 120. The second adjustment unit 150 is, for example, a height adjuster for adjusting a height of the first stage 110 relative to the base 130. Here, the height of the first stage 110 relative to the base 130 refers to a distance along the Z-axis illustrated in the drawings. The first adjustment unit 140 is, for example, a tilt adjuster for adjusting the inclination of the second stage 120 relative to the first stage 110, i.e. for adjusting the rotating dimension of the second stage 120 about the X-axis and Y-axis illustrated in the drawings.

In addition, the optical correction module 160 includes, for example, a collimator and a sensor. The collimator is used to generate a collimation beam that transmits through the first stage 110 and the second stage 120 to be projected onto the image sensor 200 (for example, onto a package glass of the CCD), and the sensor is used to sense the beam reflected by the image sensor 200 thus obtaining the inclination angle of the image sensor 200 relative to the optical system. As such, the user adjusts the inclination angle of the image sensor 200 relative to the optical system by manipulating the first adjustment unit 140 and the second adjustment unit 150, thereby aligning the image sensor 200 with the optical system by means of the alignment apparatus 100.

Figure 5:
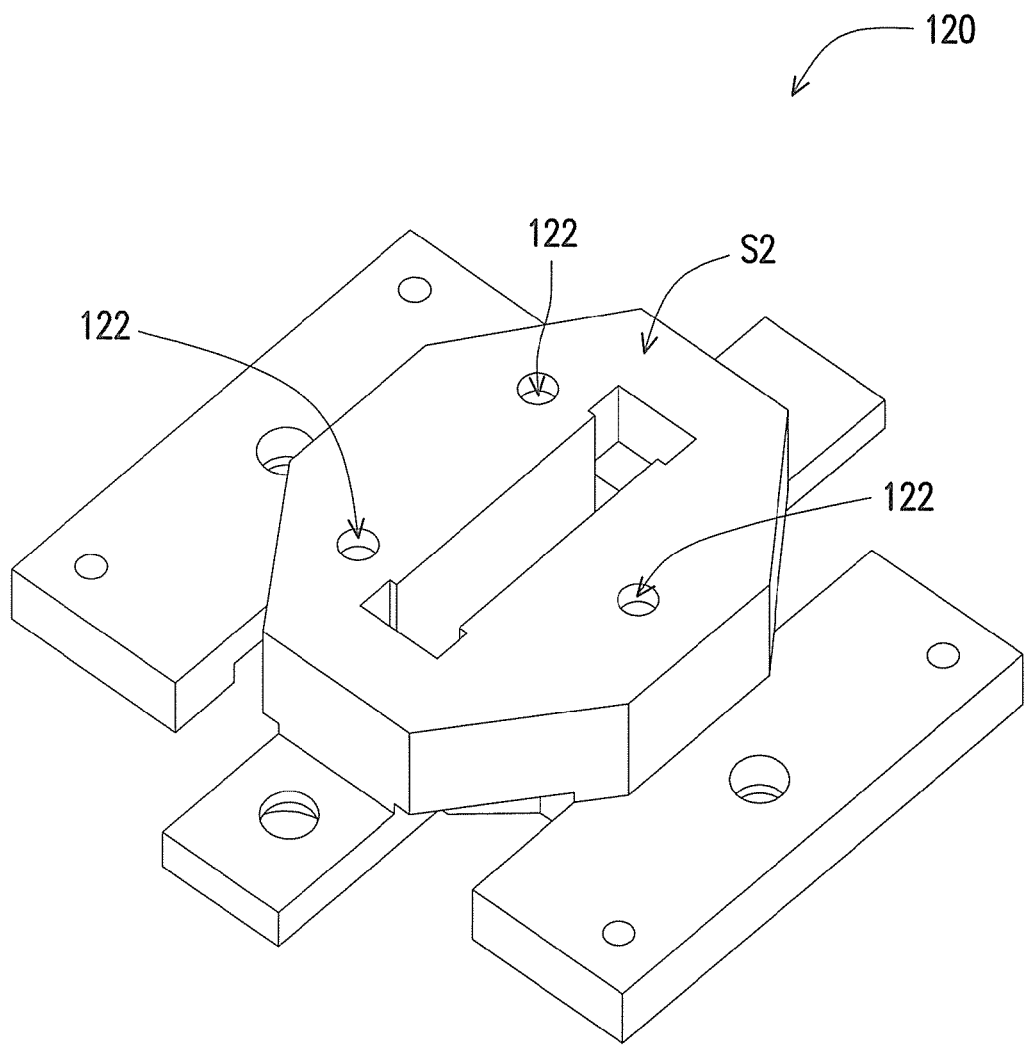
FIG. 5 illustrates the first stage of the alignment apparatus of FIG. 1.
Figure 6:
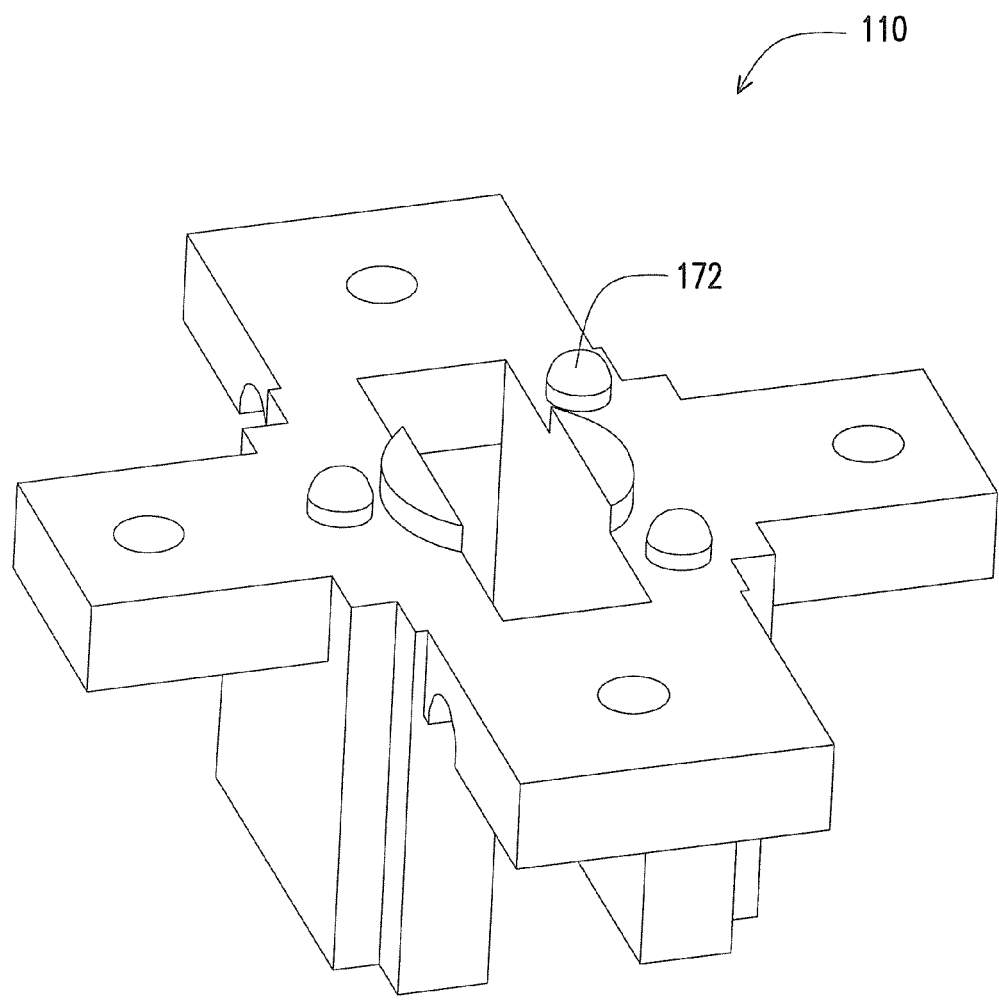
FIG. 6 illustrates the second stage of the alignment apparatus of FIG. 1.
Figure 7:
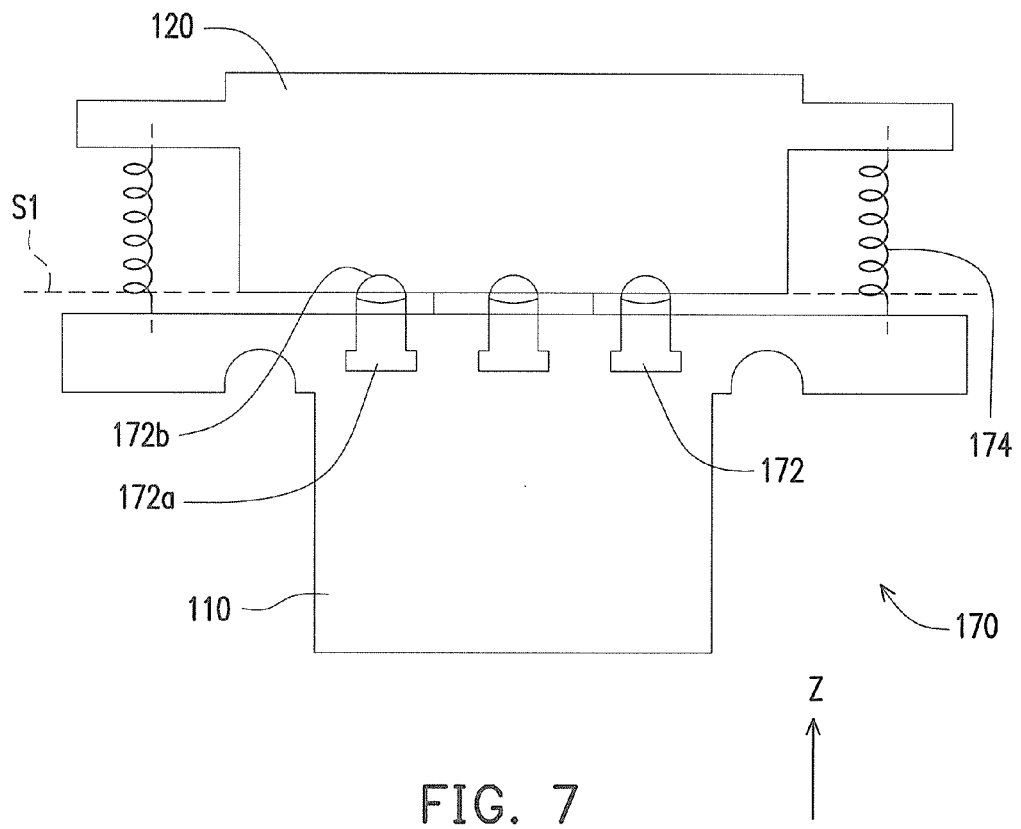
FIG. 7 is a side view illustrating the first stage of FIG. 5 and the second stage of FIG. 6 that are assembled together.

FIG. 5 illustrates the first stage of the alignment apparatus of FIG. 1. FIG. 6 illustrates the second stage of the alignment apparatus of FIG. 1. FIG. 7 is a side view illustrating the first stage of FIG. 5 and the second stage of FIG. 6 that are assembled together. In the present embodiment, the alignment apparatus 100 further includes a positioning aligned unit 170 connected between the first stage 110 and the second stage 120 and constraining the second stage 120 on a datum surface S1 above the first stage 110.

Further, the positioning aligned unit 170 includes a plurality of positioning elements 172 and a plurality of elastic elements 174. The positioning elements 172, i.e ball bearings, are disposed on the first stage 110 to form the datum surface S1. The elastic elements 174 are connected between the first stage 110 and the second stage 120. In this case, the elastic force of the elastic elements 174 pulls the second stage 120 toward the first stage 110 such that the second stage 120 rests against the positioning elements 172. In other words, during rotation of the second stage 120 relative to the first stage 110 under the driving of the first adjustment unit 140, the second stage 120 is caused to rest against the positioning elements 172 by means of the elastic elements 174. This effectively avoids the relative movement, especially in Z-axis, between the two stages 110, 120 due to the rotation of the second stage 120 relative to the first stage 110 that exists in the prior art, such that the second stage 120 is maintained on the datum surface S1 above the first stage 110 during adjustment, thereby improving the stability of the second stage 120.

More specifically, the second stage 120 includes a plurality of first coupling portions 122 on a bottom side S2 thereof. In a preferred embodiment of the invention, the number of the first coupling portions is equal or greater than three. The surface contour of the first coupling portion 122 is in the shape of a partial sphere. Each ball bearing 172 has a base portion 172a and a second coupling portion 172b. The base portion 172a is embedded into the first stage 110, and the second coupling portion 172b is formed on the base portion 172a and has a spherical surface contour that conforms to the contour of the first coupling portion 122. As such, with the corresponding and movable coupling between the first coupling portions 122 and the second coupling portions 172b, the second stage 120 can unresistedly move on the first stage 110. Due to the elastic elements 174 interconnecting the first stage 110 and the second stage 120, the second stage 120 will not generate a Z-axis displacement relative to the first stage 110 during movement of the second stage 120. Further, when the first stage 110 and the second stage 120 are parallel to each other (as shown in FIG. 7), the datum surface S1 on which the second stage 120 is constrained is a substantially planar surface. However, when the second stage 120 moves relative to the first stage 110 such that they are not parallel to each other, the datum surface S1 on which the second stage 120 is constrained is substantially a sphere, i.e. at this time, the second stage 120 moves along a circumscribed sphere as the datum surface formed by the top of the second coupling portions 172b of the positioning elements 172.

With further reference to FIG. 2 and FIG. 3, in the present embodiment, the first adjustment unit 140 includes a frame 142 and a plurality of adjustment elements 144. The frame 142 is assembled on an extension arm 132 of the base 130. The orthographic projections of the first stage 110, the second stage 120 and the optical correction module 160 onto the frame 142 are located substantially within an opening 142a of the frame 142.

Figure 8:
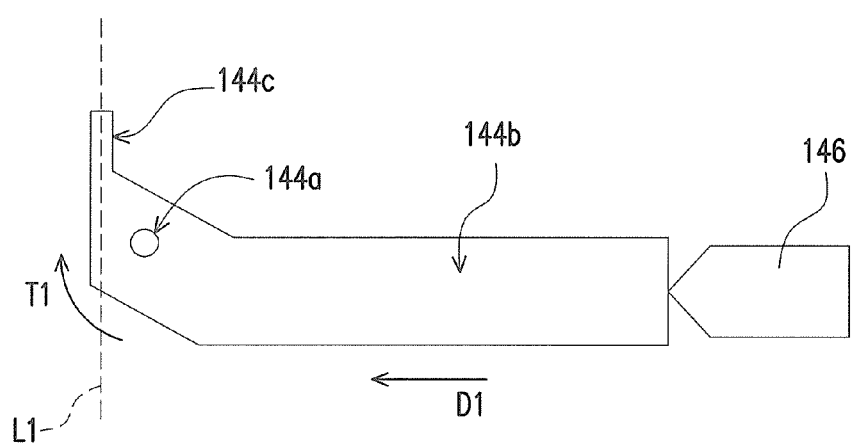
FIG. 8 is a side view of the adjustment element of FIG. 3.

FIG. 8 is a side view of the adjustment element of FIG. 3. Referring to FIG. 2, FIG. 3 and FIG. 8, the adjustment elements 144 are disposed on the frame 142 and each adjustment element 144 includes a pivot portion 144a, an adjustment portion 144b, and an abutting portion 144c. The pivot portion 144a is pivotably connected to the frame 142. The adjustment portion 144b is disposed outside the frame 142. The abutting portion 144c is disposed inside the frame 142 and movably coupled to the second stage 120. In addition, the orthographic projection of the pivot portion 144a onto a normal line L1 of the first stage 110 is located between the orthographic projection of the abutting portion 144c onto the normal line L1 and the orthographic projection of the adjustment portion 144b onto the normal line L1.

In other words, when a user drives the adjustment portion 144b, it will cause the adjustment portion 144b to move in a direction D1. At this time, the adjustment portion 144b generates a torque T1 relative to the pivot portion 144a so as to rotate the abutting portion 144c relative to the pivot portion 144a, such that the adjustment elements 144 can rotate the second stage 120. In this case, a plurality of micrometers 146 respectively coupled to the adjustment portions 144b may also be disposed on the frame 142. As such, the user can precisely manipulate the plurality of adjustment elements 144 so as to adjust the inclination angle of the second stage 120 relative to the first stage 110.

In addition, in the present embodiment, the second adjustment unit 150 is substantially located at one side of the frame 142, and the adjustment elements 144 are located at another two sides of the frame 142 adjacent the second adjustment unit 150. This allows the user to be at the second adjustment unit 150 while operating the alignment apparatus 100, thus facilitating the user manipulating the adjustment elements 144 of the first adjustment unit 140 with his or her left and right hands, respectively, thereby increasing the convenience of the operating the alignment apparatus 100.

In summary, in the alignment apparatus of the above embodiments of the present invention, the first stage and the second stage are floatingly coupled to each other, and the positioning aligned unit is disposed between the two stages, such that the second stage can be driven by the adjustment unit to rotate relative to the first stage and can be constrained on the datum surface by the positioning aligned unit. This allows the relative displacement between the second stage and the first stage due to rotation of the second stage to be compensated for by the positioning aligned unit, such that the second stage can still be maintained on the datum surface, thus increasing the stability of the second stage during movement.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An alignment apparatus for adjusting an image sensor, the alignment apparatus comprising:
    a first stage;
    a second stage floatingly disposed on the first stage, the image sensor adapted to be disposed on the second stage;
    a positioning aligned unit connected between the first stage and the second stage and constraining the second stage on a datum surface above the first stage; and
    a first adjustment unit coupled to the second stage to drive the second stage to rotate along the datum surface.

2. The alignment apparatus according to claim 1, wherein the positioning aligned unit comprises:
    a plurality of positioning elements disposed on the first stage; and
    a plurality of elastic elements connected between the first stage and the second stage, the elastic elements driving the second stage to rest against the positioning elements.

3. The alignment apparatus according to claim 2, wherein the second stage comprises a plurality of first coupling portions, each positioning element comprises a base portion and a second coupling portion, the base portion is embedded into the first stage, the second coupling portion is disposed on the base portion, the second coupling portions form the datum surface and are coupled to the first coupling portions, respectively.

4. The alignment apparatus according to claim 3, wherein a surface contour of each of the first coupling portions conforms to a surface contour of a corresponding one of the second coupling portion.

5. The alignment apparatus according to claim 4, wherein the surface contour of each of the first coupling portions and the surface contour of each of the second coupling portions are each a sphere.

6. The alignment apparatus according to claim 1, wherein when the second stage is parallel to the first stage, the datum surface is a planar surface.

7. The alignment apparatus according to claim 1, wherein when the second stage is not parallel to the first stage, the datum surface is a sphere.

8. The alignment apparatus according to claim 1, wherein the first adjustment unit comprises:
    a frame; and
    a plurality of adjustment elements pivotably connected to the frame and movably abutting against a bottom side of the second stage.

9. The alignment apparatus according to claim 8, wherein each adjustment element comprises a pivot portion, an adjustment portion and an abutting portion, and the orthographic projection of the pivot portion onto a normal line of the first stage is located between the orthographic projection of the abutting portion onto the normal line and the orthographic projection of the adjustment portion onto the normal line.

10. The alignment apparatus according to claim 8, further comprising:
    a base on which the first stage, the first adjustment unit and the frame are respectively disposed; and
    a second adjustment unit connected between the base and the first stage, the second adjustment unit driving the first stage to translate relative to the base.

11. The alignment apparatus according to claim 10, wherein the second adjustment unit is located at one side of the frame, and the adjustment elements are located at another two sides of the frame adjacent the second adjustment unit.

12. The alignment apparatus according to claim 1, further comprising an optical correction module disposed on the base and under the first stage.

* * * * *